United States Patent [19]

Reed et al.

[11] Patent Number: 5,593,136
[45] Date of Patent: Jan. 14, 1997

[54] GAS FLOW RATE REGULATOR

[75] Inventors: George D. Reed, Toledo; Robert L. Weaver, Sylvania, both of Ohio

[73] Assignee: B&F Medical Products, Inc., Toledo, Ohio

[21] Appl. No.: 286,651

[22] Filed: Aug. 5, 1994

[51] Int. Cl.⁶ .................................................. F16K 5/10
[52] U.S. Cl. ............................................ 251/366; 251/206
[58] Field of Search ........................ 251/206, 207, 251/205, 208, 121, 304, 366, 367; 137/505.11, 505, 505.25

[56] References Cited

U.S. PATENT DOCUMENTS 3,949,966  4/1976  Fabish ................................ 251/206
4,655,246  4/1987  Phlipot et al. ................... 251/206 X Primary Examiner—Kevin Lee
Attorney, Agent, or Firm—Marshall & Melhorn

[57] ABSTRACT

An improved rotor retainer housing for a rotatable rotor body of a gas flow rate regulator. A retainer housing having structural features equivalent to the essential corresponding features of a conventional metal part is formed of molded plastic. A thin metallic layer is provided on the exposed surfaces of the molded plastic part to enhance surface conditions for maintaining an effective seal between the retainer housing and associated parts.

14 Claims, 1 Drawing Sheet

GAS FLOW RATE REGULATOR

BACKGROUND OF THE INVENTION

1. Field of the Invention

The present invention pertains broadly to a gas flow regulator, and more particularly to a novel housing for a rotatable rotor body of a flow rate selection device.

2. Description of the Prior Art

Metering units for supplying oxygen to patients at various selected rates are well known and are in widespread use in the medical field. One type of unit employs an indexing control valve which is rotatable to a plurality of defined positions, each position providing a different rate of flow of gas to the patient. The rate of flow is determined by passing the gas from a storage tank through a selected one of a plurality of metering orifices in a rotary metering disk. The metering orifices are designed to, in one way or another, restrict the flow in varying amounts so that the various orifices may provide flow rates less than or on the order of 0.5, 1.0, 1.5, 2.0, 3.0 and on up to 8.0 liters per minute or more. The metering disk is rotatably mounted within a cylindrical housing or shell, and as the metering disk is rotated to selected rotary positions, only one orifice at a time may be in communication with a passage formed in the cylindrical housing. The passage is in open communication with a fitting to which a tube is coupled for supplying the gas to the patient.

In order to assure accurate flow rates over extended periods of time and to minimize the possibility of leakage of the gas, it is essential that the elements of the flow regulator be of precision construction, durable and not subject to corrosion or deterioration in the gaseous environment. To that end, the metering disk and cylindrical housing have heretofore generally been formed of a durable inert metal such as brass. Such parts require extensive machining in their fabrication and thus, while they perform very well for their intended purpose, they are relatively expensive to produce.

SUMMARY OF THE INVENTION

In accordance with the invention there is provided a cylindrical housing for gas flow regulators of the aforedescribed type which is equal to or superior in performance to equivalent prior art parts and which is much more economical to produce. A part having structural features equivalent to the essential structural features of the prior metallic part is formed of molded plastic. The plastic part is then coated with a metallic layer, preferably of chromium or another suitable material. There is thus provided on the housing a surface contour and texture whereby an effective seal can be maintained between the metering disk unit and the cylindrical housing and between the cylindrical housing and a valve housing within which it is carried.

BRIEF DESCRIPTION OF THE DRAWINGS

In the drawings, wherein like numerals refer to like parts through.

DESCRIPTION OF THE PREFERRED EMBODIMENT

Figure 1:
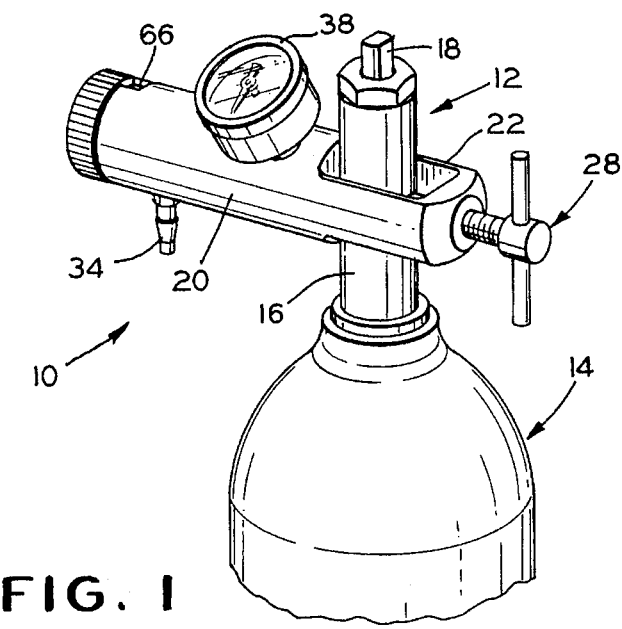
FIG. 1 is a fragmentary perspective view of a gas storage cylinder having a flow rate regulator thereon.

Referring now to the drawings, and particularly to FIG. 1, there is shown generally at 10 a gas flow regulator embodying the invention operatively mounted upon an outlet valve assembly 12 of a storage cylinder 14 such as a conventional oxygen tank. The outlet valve assembly includes a neck section 16 within which a valve (not shown) having a rotatable stem 18 is provided for opening and closing the valve. A side port (not shown) is conventionally provided in the neck section for coupling the flow regulator 10 to the storage cylinder as illustrated in FIG. 1.

The flow regulator more particularly comprises an external housing body 20 having a yoke section 22 adapted to receive the neck section 16 as illustrated in FIG. 1. Locating pins 24, and an inlet port 26 (FIG. 2) are provided on the body 20 within the yoke section. The locating pins are adapted to be received in mating recesses (not shown) in the neck section 16 and the inlet port mates with the outlet port of the neck section 16 to provide communication between the storage cylinder 14 and the flow regulator. The end of a clamping post 28 threaded through the end of the yoke section 22 is adapted to bear against the outer surface of the neck section 16 opposite the outlet port. Thus, as the clamping post is tightened down it urges the inlet port 26 into sealing engagement with the mating outlet port on the neck section.

The gaseous fluid flows from the storage cylinder 14 through the inlet port 16 and into a chamber 30 within the housing body 20. After passing through a metering system to be described, gas is emitted through an outlet opening 32 in the housing body at a selected carefully regulated rate. A fitting 34 may be threaded into the opening 32 for conventionally connecting tubing (not shown) for delivering the controlled flow of gas to a user. A second threaded opening 36 may be provided in the wall of the housing body 20 ahead of the metering system and communicating with the chamber 30 for mounting a gauge 38 indicating the amount of gas remaining within the storage cylinder.

In accordance with the invention the metering system for the flow regulator comprises a rotor retainer housing, identified generally at 40, disposed axially within the external housing body 20. The metering system per se is of generally conventional construction except for the rotor retainer housing, and thus will be described in detail as necessary for a clear understanding of the novel rotor retainer housing.

Figure 3:
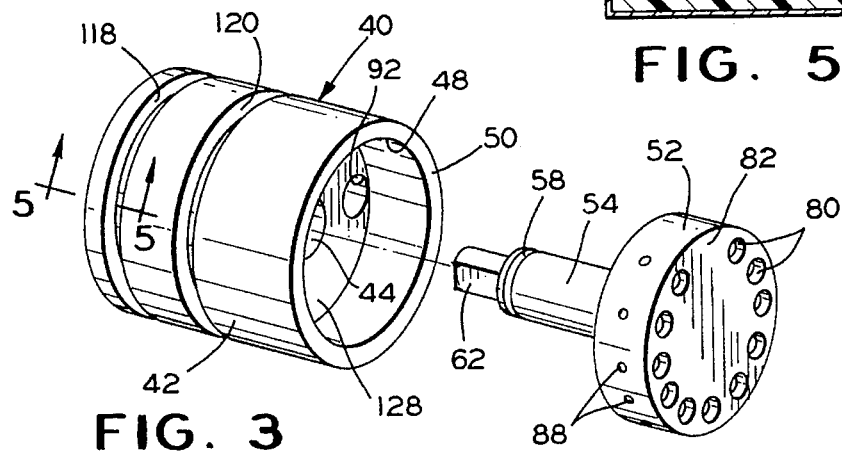
FIG. 3 is an enlarged exploded perspective view of a metering disk and cylindrical housing in accordance with the invention.
Figure 2:
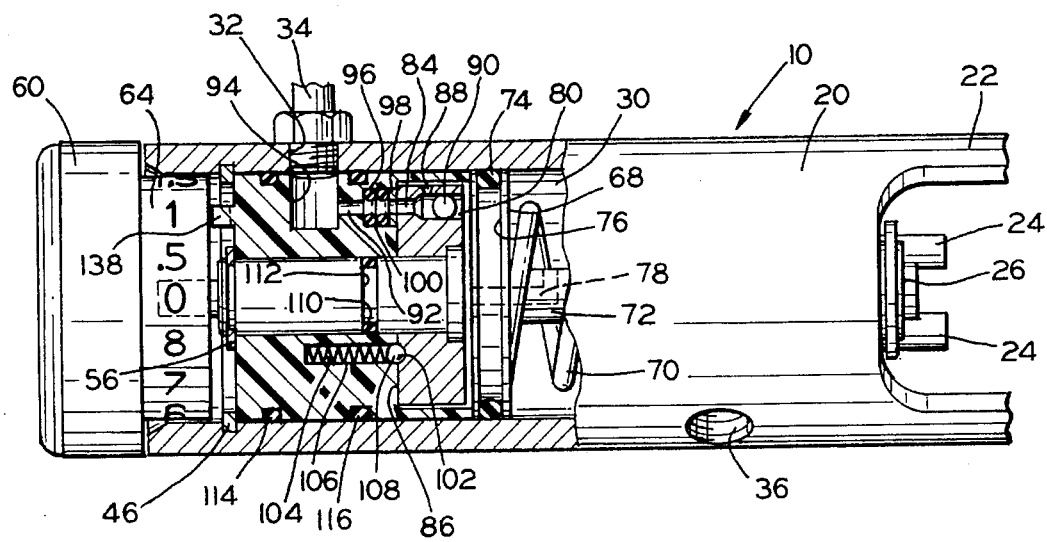
FIG. 2 is a fragmentary side elevational view, partially in section, of a gas flow regulator embodying the invention.

As best seen in FIGS. 2 and 3, the rotor retainer housing comprises a cylindrical body 42 having an opening or bore 44 extending axially therethrough. One end of the rotor retainer housing abuts a snap ring 46 seated within a circumferential groove in the interior wall of the external housing body 20. At its opposite end the rotor retainer housing is formed with a counterbore recess 48 defined by a skirt 50 extending from the main portion of the cylindrical body 42. A metering disk 52 rotatably mounted within the counterbore recess 50 includes a shaft 54 extending through the axial opening or bore 44. The metering disk and shaft are retained in assembled position within the rotor retainer housing by means of a C-clip 56 received within an annular recess 58 in the shaft. A knurled control knob 60 is mounted upon a stem 62 projecting from the shaft 54 for rotating the metering disk 52 to selected flow positions as will be described. A collar 64 projecting from the control knob into the end of the external housing body 20 has numerals on its surface coordinated with and indicative of the gas flow rate through the metering disk 52 at selected settings. The numerals are visible one at a time through a window opening 66 in the external housing body so as to indicate a gas flow rate in selected units such as liters per minute.

A piston 68 within the external housing body is urged axially by a compression spring 70 against the end of the skirt extension 50 to, in turn, urge the rotor retainer housing 40 into engagement with the snap ring 46. The compression spring encircles a shaft 72 extending from the piston and bears at its opposite end against a suitable seat (not shown) within the closed end of the external housing body. An O-ring 74 encircles the piston 68 within a recess 76 around the piston and sealingly engages the interior surface of the housing body 20 for preventing the passage of gas around and past the piston. A passageway 78 is provided within the shaft 72 and through the piston 68 for providing communication between the chamber 30 and the metering disk 52.

As will be seen in FIG. 2 the piston 68 is spaced slightly from the adjacent face of the metering disk, and the metering disk is of slightly smaller diameter than the counterbore recess 48 within which it is received. Pressurized gas thus passes from the chamber 30 through the passageway 78 to flow around the metering disk. Metering passages are conventionally provided at spaced intervals around the disk. More particularly, counterbores 80 are provided at spaced radial intervals around the end face 82 of the metering disk. Each counterbore communicates with a passage 84 (one shown in FIG. 2) extending through to the opposite end face 86 of the disk. An orifice 88 extends through the peripheral wall of the metering disk 52 to each of the passages 84. A calibrating plug 90 may be press fitted into each of the counterbores 80 so as to provide a predetermined desired rate of gas flow through each of the orifices 84 and its associated passage 88 to the adjacent base of the rotor housing 40.

The rotor housing is formed with a passage 92 extending longitudinally from the base of the counterbore recess 48 to a lateral opening 94 adapted to be aligned with the outlet opening 32 in the external housing body. The hose fitting 34 thus is in communication with the lateral opening 94. One or more donut rings 96 and a compression seal 98 are seated within a counterbore 100 at the end of the passage 92. The seal is compressively urged into engagement with the end face 82 of the metering disk, and the counterbores 80 are so positioned that they may be positioned one at a time in alignment with the counterbore of the passage 92 as the metering disk is rotated to selected rotational positions. In other words, only one of the passages 84 may be in registry with and supply gas to the passage 92 at any given rotational setting of the disk 52 to thereby provide for the regulated gas delivery rate to the hose fitting 34. As will be seen in FIG. 3, a blank space is provided between two of the adjacent counterbores 80 for completely shutting off the flow of the gas at one rotational setting of the metering disk.

In order to provide for accurate rotational positioning of the metering disk with a selected passage 84 in axial alignment with the passage 92, a series of depressions 102 (one shown in FIG. 2) is formed in the end face 86 spaced circumferentially around the metering disk and inwardly of the passages. A compression spring 104 seated within a cavity 106 formed in the housing 40 diametrically opposite the counterbore 100, urges a ball 108 toward the end face 86 and into selected ones of the depressions 102 as the metering disk is rotated. The positions of the depressions 102 and the numerals on the control knob 60 are coordinated so that at a selected flow rate setting the ball 108 will be seated within a depression 102 and the correct numeral will appear in the window opening 66.

The C-clip 56 engages the end of the retainer housing 40 and acts to secure the shaft 54 and the metering disk 52 against the forces applied by the spring loaded ball 108 and the compression seal 98 so that the sealing engagement is maintained between the end face 86 and the compression seal. An O-ring 110 seated within a recess 112 encircling the shaft 54 sealingly engages the wall of the opening 44 to prevent leakage of gas around the shaft. O-rings 114 and 116 seated within recesses 118 and 120, respectively, surrounding the cylindrical body 42, sealingly engage the inner wall of the external housing body 20 on either side of the lateral passage 94. Gas passing from the chamber 30 through the passageway 78 is thus confined to a path through a selected one of the orifices 88 and associated passage 84, the passage 92, and the lateral opening 94 for discharge through the hose fitting 34.

As indicated above the part equivalent to the rotor retainer housing 40 has heretofore conventionally been formed of a metal casting as of brass, requiring extensive machining to produce the finished part. In accordance with the invention the rotor retaining housing comprises a body of plastic formed by precision injection molding, providing performance equivalent to or superior to that of the prior metallic part at a fraction of the cost. By way of example, the cost may be on the order of one tenth that of the prior art part.

The rotor retainer housing 40 more particularly is formed with the cylindrical body 42 having the skirt extension 50 defining the counter bore recess 48 at one end. In order to minimize the amount of material required, the opposite end of the housing is formed with inwardly extending cavities 122 defined by an outer circumferential wall 124 and an interior cylindrical portion 126 through which the opening or bore 44 extends. A wall 128 within the cylindrical body normal to the longitudinal axis serves as the end of the counterbore recess 48 and the base of the cavities 122. The cavities 122 are separated by integral stiffening members 130, 132 and 134 extending from the cylindrical portion 126 to the wall 124 and disposed at approximately 120° intervals around the housing.

Figure 4:
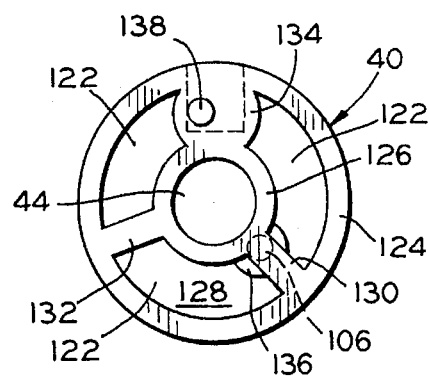
FIG. 4 is an end view of the cylindrical housing as viewed from the left end in FIG. 3.

As will be seen in FIG. 4, the stiffening member 130 is formed with a thickened lower section 136 within which the cavity 106 is formed. The stiffening member 134 is of enlarged cross section to allow formation of the passage 92 and the lateral opening 94 therein. A post 138 is provided on the end of the member 134 for engaging a similar post (not shown) suitably positioned on the control knob 60 to prevent the knob and the metering disk 52 from being rotated through 360°, and thus directly between positions of zero flow and maximum flow or vice versa.

The rotor retainer housing 40 may be formed of any of a number of plastic materials which are capable of being suitably molded and which are rigid, durable and inert to the environment in which the housing will be employed. The ABS family of plastics has been found particularly well suited to that end. A rotor housing injection molded of ABS plastic and having the novel configuration of the invention has been found to satisfy all of the aforementioned criteria and to function in a manner equivalent to the machined metallic rotor housing employed heretofore in such flow rate regulators. However, a certain amount of leakage has been found to occur in flow regulators of this type due to limitations in the sealing capability of the O-rings between the rotor housing 40 and the external housing body 20 and between the rotor housing and the shaft or stem 54. In accordance with the invention it has been found that the amount of such leakage can be greatly reduced, to a level well below that heretofore deemed acceptable in gas flow regulators, by applying a thin metallic coating to the surface of the plastic rotor housing. Such parts as formed may have minute surface irregularities, not perceptible to the touch or visible to the naked eye, but which prevent formation of an effective gas-tight seal between the O-ring and the surface. By proper application of a metallic film to the surface of the plastic part, the effect of the irregularities can be minimized or eliminated and the sealing capability of the O-rings greatly enhanced.

Figure 5:
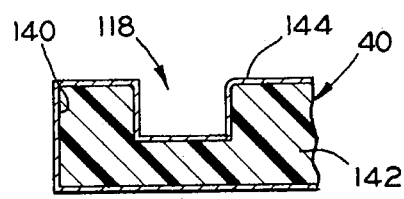
FIG. 5 is an enlarged fragmentary section through a portion of the peripheral side wall of the cylindrical housing including an annular recess for receiving an O-ring.

More particularly as will be seen in FIG. 5, the exposed surfaces 140 of the plastic mass 142 forming the rotor retainer housing 40 are covered by a metallic layer 144. The metal forming the layer needs to be capable upon deposition of minimizing the effect of the minute irregularities and presenting a surface with which the O-ring will maintain a sealing engagement. Metallic coating of plastic parts for various purposes such as appearance is known in the prior art, and a number of metals may be employed for achieving a particular effect. Excellent results have been obtained in accordance with the invention by depositing a chrome layer on the order of 0.001 to 0.003 inch (0.0254 to 0.0762 mm) in thickness upon the plastic substrate by a vacuum metallizing process. The layer exhibits good adhesion to the plastic, and as it is deposited the metal flows into and evens out any minor irregularities which be present on the surface.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

What is claimed is:

1. A rotor retainer housing for a gas flow regulator, comprising an elongated cylindrical molded plastic body having opposite ends, said cylindrical body including a rotor-receiving skirt at one of said ends, a bore extending axially through a sleeve within the plastic body, at least one O-ring receiving recess formed in an outer surface of said cylindrical body and extending circumferentially therearound, and at least one cavity extending into said plastic body from the other of said ends, said one cavity being open at said other end and disposed between said sleeve and an outer circumferential wall of said cylindrical body.

2. A rotor retainer housing for a gas flow regulator as claimed in claim 1, including three of said cavities extending into said plastic body, said cavities being separated by stiffening members extending between said sleeve and said outer circumferential wall.

3. A rotor retainer housing for a gas flow regulator as claimed in claim 2, wherein said stiffening members extend radially outwardly from said sleeve to said circumferential wall at substantially equal angular intervals around said sleeve.

4. A rotor retainer housing for a gas flow regulator as claimed in claim 2, including an opening extending laterally within one of said stiffening members and through said outer circumferential wall, and a passage extending longitudinally within said one stiffening member between said laterally extending opening and said one end of body.

5. A rotor retainer housing for a gas flow regulator as claimed in claim 4, including two of said O-ring receiving recesses extending circumferentially around said cylindrical body, one of said recesses being on either side of said laterally extending opening.

6. A rotor retainer housing for a gas flow regulator as claimed in claim 1, including a metallic coating deposited upon and adhered to the exposed surface of said plastic body at least in areas adapted for engagement with seal members.

7. A rotor retainer housing for a gas flow regulator as claimed in claim 6, wherein said O-ring receiving recess includes said metallic coating.

8. A rotor retainer housing for a gas flow regulator as claimed in claim 7, wherein said metallic coating is deposited upon and adhered to substantially the entire exposed surface of said molded plastic body.

9. A rotor retainer housing for a gas flow regulator as claimed in claim 6, wherein said metallic coating comprises a vacuum metallized chrome layer.

10. A rotor retainer housing for a gas flow regulator as claimed in claim 9, wherein said layer is between about 0.001 and 0.003 inch in thickness.

11. A rotor retainer housing for a gas flow regulator, comprising an elongated cylindrical molded plastic body, said cylindrical body including a rotor-receiving skirt at one of its ends, a bore extending axially through the molded plastic body, at least one O-ring receiving recess formed in the outer surface of said cylindrical body and extending circumferentially therearound, and a metallic coating deposited upon and adhered to the exposed surface of said body at least within said recess and the surface defining said bore.

12. A rotor retainer housing for a gas flow regulator as claimed in claim 11, including a said metallic coating upon substantially the entire exposed surface of said plastic body.

13. A rotor retainer housing for a gas flow regulator as claimed in claim 12, wherein said metallic coating comprises a vacuum metallized chrome layer.

14. A rotor retainer housing for a gas flow regulator as claimed in claim 12, wherein said layer is between about 0.001 and 0.003 inch in thickness.

\* \* \* \* \*